United States Patent [19]

Hilbert et al.

[11] Patent Number: 4,529,335

[45] Date of Patent: Jul. 16, 1985

[54] SYSTEM FOR TRANSFERRING CARRIER FROM ONE PNEUMATIC CARRIER RECEIVING/DISPATCHING STATION TO ANOTHER

[76] Inventors: John J. Hilbert, 3619 W. 187th St., Torrance, Calif. 90504; Jerry W. Dixon, 2209 Lynngrove, Manhattan Beach, Calif. 90266; Allen L. Egbert, 6328 Pitcairn, Cypress, Calif. 90630

[21] Appl. No.: 477,613

[22] Filed: Mar. 22, 1983

[51] Int. Cl.³ .............................................. B65G 51/24
[52] U.S. Cl. ........................................ 406/1; 406/182
[58] Field of Search .......... 406/1, 2, 13, 112, 181–183

[56] References Cited

U.S. PATENT DOCUMENTS 4,058,274 11/1977 Hochradel et al. ...................... 406/2

FOREIGN PATENT DOCUMENTS 2337369 2/1975 Fed. Rep. of Germany ...... 406/182
2336326 7/1977 France .................................... 406/1

Primary Examiner—Jeffrey V. Nase
Attorney, Agent, or Firm—Kendrick, Netter & Bennett

[57] ABSTRACT

A system for transferring pneumatic carriers from one pneumatic carrier receiving/dispatching station to another includes a first pneumatic carrier diverter, or a plurality of such first diverters, each with an inlet/outlet linked through pneumatically-sealed tubes to at least one such station, a multiplicity of outlets, and a device for shiftably linking the inlet/outlet of the diverter to any one of its multiple outlets; a second pneumatic carrier diverter, or a plurality of such second diverters, each with a multiplicity of inlets and a single outlet, and a mechanism for shiftably linking the multiplicity of inlets to the outlets; the system including either a plurality of such first diverters, or a plurality of such second diverters, or both; pneumatically-sealed tubes joining, in parallel, all the diverters of the first kind of all the diverters of the second kind; and a pressure/vacuum supply device joined to the outlet of one or more of the second kind.

18 Claims, 7 Drawing Figures

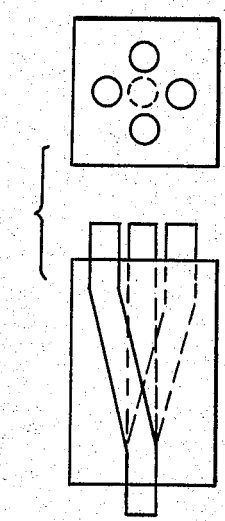
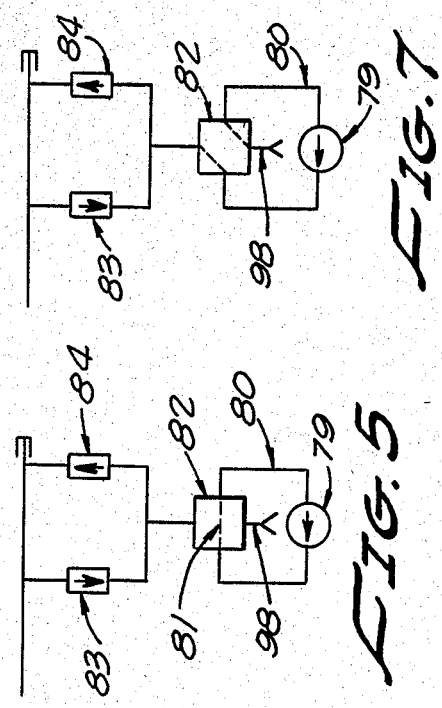
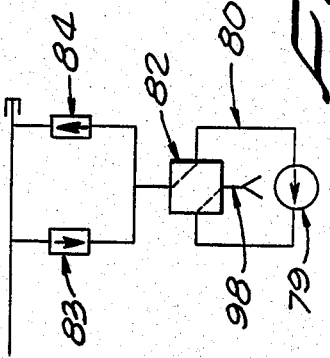
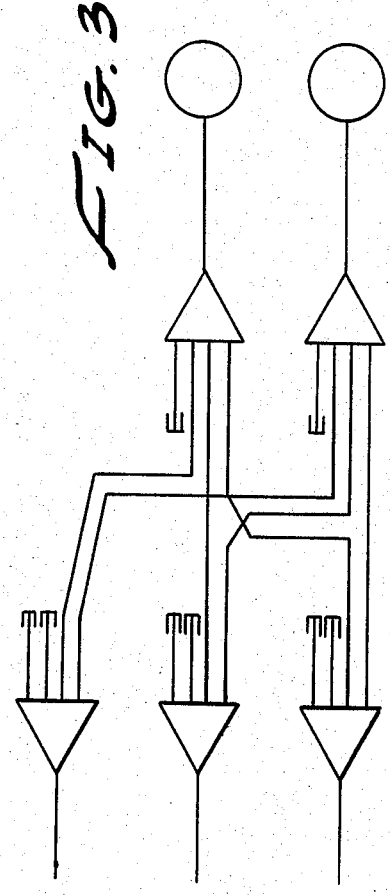
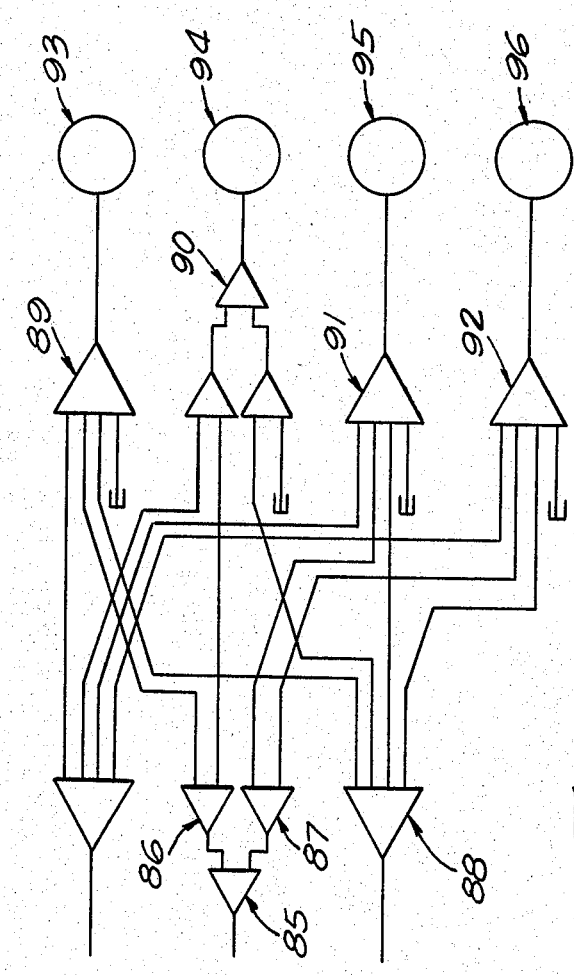

SYSTEM FOR TRANSFERRING CARRIER FROM ONE PNEUMATIC CARRIER RECEIVING/DISPATCHING STATION TO ANOTHER

This invention relates to pneumatic tube systems, and, in particular, to pneumatic tube systems including two, three or more groups of receiving/dispatching stations, and a system for transferring the carriers from one station to another, directly, rapidly, and efficiently.

The new pneumatic tube system includes a system for transferring carriers from one pneumatic carrier receiving/dispatching station to another, whether the receiving and dispatching stations are within a single group of such stations including a plurality of subgroups, or in different groups of such stations. This new transferring system includes one or more of a first kind of pneumatic carrier diverters, each with inlet means linked through pneumatically-sealed tubes to at least one of such stations, a multiplicity of outlet means, and means for shiftably linking the inlet means of the diverters of the first kind to any one of its outlet means. The transfer system also includes a second kind of pneumatic carrier diverter, each having a multiplicity of inlet means, outlet means and means for shiftably linking any one of the multiplicity of inlet means to the outlet means in diverters of the second kind. The system includes either a plurality of diverters of the first kind, a plurality of diverters of the second kind, or both.

The diverters of the first kind are joined to the diverters of the second kind in parallel, with pneumatically-sealed tubes linking outlet means in the diverters of the first kind to inlet means in the diverters of the second kind. Each diverter of the second kind has outlet means joined to means for supplying pressure and vacuum to the system.

Where the system includes two or more pressure/vacuum supply means, each is preferably operable simultaneously and independently of the others. When two or more such supply means are operating simultaneously, one can be supplying pressure while the other is supplying vacuum. Each may be supplying pressure simultaneously; each may be supplying vacuum simultaneously; or each may be in neutral simultaneously. Further, the pressure/vacuum supply means are sufficiently independent of one another that any one of them can remain in the pressure cycle, the vacuum cycle or in neutral a longer period of time or a shorter period of time than any of the others in the system, whether operating simultaneously or not.

The transferring system also includes means for directing a pneumatic carrier entering the system to and through any of the selected diverters of the second kind and for then directing such a pneumatic carrier to and through any selected diverter of the first kind, and then out of the system through the inlet means to that diverter of the first kind.

Our new system for transferring pneumatic carriers from one receiving/dispatching station to another has the capacity, and includes means for transferring a pneumatic carrier from one group of stations to another group with two or fewer shifts in the diverters of the first and second kinds. Our new pneumatic transferring system may also include means for transferring a pneumatic carrier from one station in a group to another station in the same group with two or fewer shifts in the diverters of the first and second kinds, and without the carrier ever leaving the group where the transfer takes place.

Because the diverters of the first and second kinds are joined to one another in parallel, the pneumatic tube system including our new transfer system can utilize any one of the pressure/vacuum supply means for transferring a pneumatic carrier from a station in one group of stations to a station in a second group of stations or from one station to another within a single group containing two or more subgroups of at least two stations each.

Subgroups including at least two stations also preferably include a station diverter. The inlets of the station diverter are linked, through pneumatically-sealed tubes, to the inlet-outlet of at least two stations within a subgroup, and the outlet means of the station diverter is linked, through pneumatically-sealed tubes, to the inlet means of a subgroup diverter. The subgroup diverter may have its inlet means joined to the outlets of two, three or more station diverters within a group, and its outlet means linked to the transfer system of our invention. This configuration permits the transfer of a pneumatic carrier from any station in one subgroup to any station within any other subgroup of the same group with two or fewer shifts in the diverters of the first and second kinds within the transfer system. And the pneumatic carrier need not leave the group that includes the two subgroups during the transfer.

Our new pneumatic tube systems including our new pneumatic carrier transfer system not only permit and facilitate transfer of a pneumatic carrier from one group of stations to another group, or from one station within a group to another station within the same group, but permit and facilitate simultaneous pneumatic carrier transfers between groups of stations and within any one group, provided the system includes at least two pressure/vacuum supply means.

Our new pneumatic tube systems and our new pneumatic carrier transferring system can better be understood by reference to the drawings that accompany and form part of this specification, in which:

FIG. 2 is a schematic diagram of a different embodiment of our new pneumatic carrier transfer system;

FIG. 3 is a schematic diagram of a third embodiment of our new pneumatic carrier transfer system;

Figure 1:
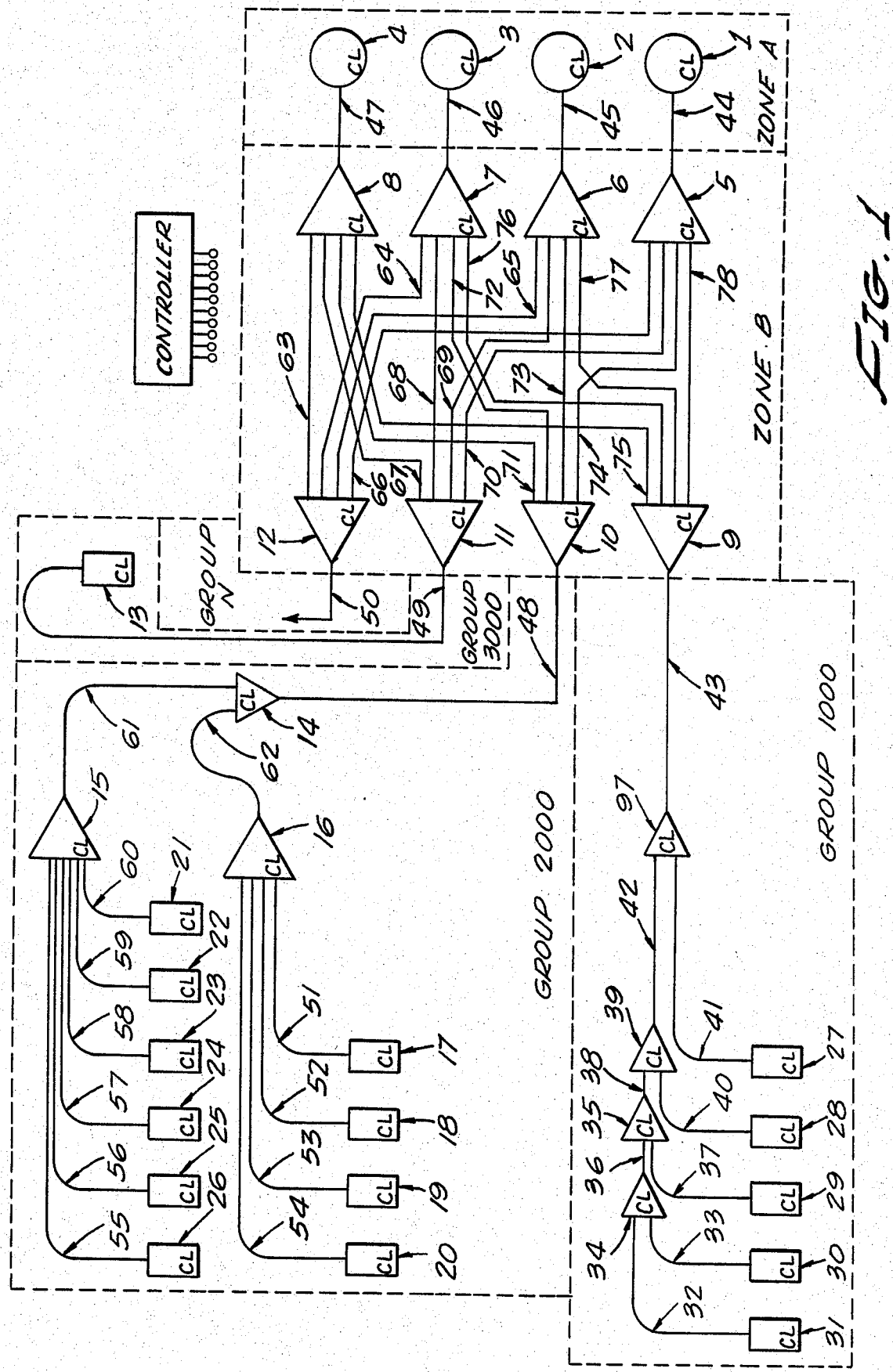
FIG. 1 is a schematic diagram of a multi-group pneumatic tube system including an embodiment of the pneumatic carrier transfer system of our invention.

FIG. 4 includes side elevation, and end elevation views of a typical diverter useful in our new pneumatic carrier transfer systems and in our new pneumatic tube systems;

FIG. 5 is a schematic diagram of a pressure/vacuum supply means, shown in the neutral position;

FIG. 6 is a schematic diagram of the pressure/vacuum supply means shown in FIG. 5, shown in the vacuum supplying position; and FIG. 7 is a schematic diagram of the pressure/vacuum supply means shown in FIGS. 5 and 6, shown in the pressure supplying position.

FIG. 1 is a schematic diagram of the pneumatic carrier transfer system of our invention, shown within zones A and B, linked to three or more groups of receiving/dispatching stations forming a pneumatic tube system with at least one group of stations including two subgroups of such stations.

Within zone A are pressure/vacuum supply means 1, 2, 3 and 4 (or more if desired). Within zone B is a plurality of diverters of the first kind, called line diverters, and labeled 9, 10, 11 and 12 (or more if desired). Zone B also includes a plurality of diverters of the second kind, called exchange diverters and labeled 5, 6, 7 and 8 (or more if desired). (However, as FIGS. 2 and 3 show, our new pneumatic carrier transfer system can include more line diverters than exchange diverters, or more exchange diverters than line diverters, provided the system includes a plurality of diverters of either the first kind, or of the second kind, or both.)

Referring again to FIG. 1, zones A and B, line diverter 9 is linked, through pneumatically-sealed tubes, on its outlet side, to the inlet of each of the exchange diverters 5, 6, 7 and 8 through lines 78, 77, 76 and 75, respectively. Similarly, line diverter 10 is linked to each of the exchange diverters on its outlet side, and, through pneumatically-sealed tubes, to the inlet of each of exchange diverters 5, 6, 7 and 8, through lines 74, 73, 72 and 71, respectively. In similar fashion, line diverters 11 and 12 are linked to each of the exchange diverters through lines 70-67 and lines 66-63, respectively.

FIG. 1 also shows three (or more, up to an indefinite number N) zones or groups of receiving/dispatching stations, labeled group 1000, group 2000, group 3000 and group N, respectively. Group 1000 is linked, through pneumatically-sealed user tube 43, to line diverter 9. This link also forms the inlet to our new pneumatic carrier transfer system. Group 2000 is linked to our carrier transfer system through user tube 48, which forms the inlet to line diverter 10. Station group 3000 is linked to our new carrier transfer system through pneumatically-sealed tube 49, which forms the inlet to line diverter 11. The pneumatic tube system of our invention may include many more groups or zones of stations than the three illustrated in FIG. 1. The inlet line to the diverter 12 from group N, labeled line 50, so indicates.

Station group 1000 includes a plurality (up to an indefinite number N) of receiving/dispatching stations for pneumatic carriers, labeled 27, 28, 29, 30 and 31, respectively. Station 27 is linked, through pneumatically-sealed station tube 41, to station diverter 97, and, from there, to user tube 43 on the outlet side of station diverter 97. Station 28 in station group 1000 is linked to user tube 43 through station tube 40, station diverter 39, trunk tube 42, station diverter 97, and user tube 43. Similarly, stations 29-31 are linked to user tube 43 through station tubes 37, 33 and 32, respectively, station diverter 34, trunk tube 36, station diverter 35, trunk tube 38, station diverter 39, trunk tube 42, and station diverter 97.

Station group 2000 includes two subgroups of stations. The first subgroup includes stations 17-20. Station tubes 51-54 link these stations to station diverter 16. The outlet from station diverter 16, namely branch tube 62, is linked to the inlet side of branch diverter 14. Similarly, the second subgroup within group 2000, including stations 21-26, is linked to station diverter 15 through pneumatically-sealed station tubes 60-55, respectively. The outlet from station diverter 15, namely branch tube 61, is linked to a second inlet means to branch diverter 14. The outlet from branch diverter 14, namely user tube 48, links station group 2000 to our new pneumatic carrier transfer system within zones A and B.

Station group 3000 includes, in this example, just one station, namely 13, joined to our new pneumatic carrier transfer system (zones A and B) through station tube/user tube 49, which is linked to the inlet of line diverter 11.

FIG. 4 provides a schematic illustration of the branch diverters, line diverters, station diverters, and exchange diverters shown in FIG. 1. As FIG. 4 shows, a single outlet/inlet means on one side of the diverter can be shiftably linked to any of the inlet/outlet means on the other side of the diverter.

FIGS. 5-7 show the operation, in schematic diagrams, of pressure/vacuum supply means 1-4. In FIG. 5, the supply means is in neutral. Air supply pump 79 simply circulates air through loop 80 including a shiftable line or path 81 shown in dotted form in box 82. FIG. 6 shows the same supply means 79 operating to produce a vacuum in the pneumatic tube system. Pump 79 draws air from a pneumatic tube system through valve 83, and out to exhaust 98. FIG. 7 shows the same means operating to produce pressure in a pneumatic tube system. In this operation, pump 79 pushes air through box 82 and into the system via valve 84.

Referring again to FIG. 1, a transfer between a station in one of the subgroup of stations in group 2000 to a station in the second subgroup can be made as follows. After inserting a pneumatic carrier into a station such as 19, an operator inputs the carrier's destination station, here station 25. The operator then inputs a request to the system controller to send the carrier to station 25. At the proper time, station tube 53 is linked to branch tube 62 by station diverter 16. Simultaneously, branch tube 62 is linked to user tube 48 by branch diverter 14.

User tube 48 can be linked to any one of four or more zone exchange tubes 74, 73, 72 and 71. In this example, the controller selects zone exchange tube 73. User tube 48 is linked to zone exchange tube 73 by line diverter 10. Exchange tube 73 is linked to air supply tube 45 through exchange diverter 6. All of diverters 16, 14, 10 and 6, move simultaneously, as necessary, to the location that the controller dictates.

Pressure/vacuum supply means 2, normally in neutral (see FIG. 5), now shifts to provide vacuum to the system (see FIG. 6). Supply means 2 imposes vacuum, or negative pressure, on the pneumatic carrier at sending station 19. The pneumatic carrier leaves station 19, travels through station tube 53, station diverter 16, branch tube 62, branch diverter 14, and into user tube 48. The controller senses that the carrier has passed through branch diverter 14, and into user tube 48. Accordingly, air supply means 2 shifts to neutral (see FIG. 5), and the pneumatic tube carrier coasts to a stop in user tube 48.

The controller now links user tube 48 to branch tube 61 through branch diverter 14. Branch tube 61 is simultaneously linked to station tube 56 through station diverter 15. Line diverter 10 and exchange diverter 6 remain unchanged. Supply means 2 now shifts to its pressure cycle (see FIG. 7), and imposes positive pressure on the carrier in user tube 48. The carrier moves from user tube 48, through branch diverter 14, branch tube 61, through station diverter 15, station tube 56 and into station 25. The controller senses arrival of the carrier in station 25, and shifts supply means 2 to neutral. The complete intragroup transfer requires just two, or fewer, diverter shifts.

To illustrate a typical carrier transfer between groups, assume a transfer of a pneumatic carrier from station 27 to station 18. After insertion of a carrier at station 27, an operator inputs destination station 18 to the system, and enters a send instruction to the controller. At an appropriate time, the controller links station tube 41 to user tube 43 through station diverter 97. User tube 43 can be linked, through line diverter 9, to any of exchange tubes 78, 77, 76 and 75. The zone exchange tube selected is at the option of the controller, and depends in part on which, if any, of the pressure/vacuum supply means 1, 2, 3 and 4 are operating. In this example, the controller selects supply means 3. User tube 43 is linked to exchange tube 76 through line diverter 9. Exchange tube 76 is linked to air supply tube 46 through exchange diverter 7. All diverters move simultaneously, as necessary.

Supply means 3 imposes a vacuum on the system, directing the carrier through the selected path until it comes to rest in air supply tube 46. Now, diverters 7, 10, 14 and 16 shift, as necessary, linking air supply tube 46 to station tube 52 through branch tube 62, user tube 48, and zone exchange tube 72. This shift constitutes the final diverter shift in the transfer.

After this final shift, the controller shifts supply means 3 to the pressure cycle, thus imposing pressure on the pneumatic carrier resting in tube 46. Once the carrier reaches station 18, the intergroup transfer is complete, and supply means 3 shifts to neutral.

FIG. 2 illustrates other types of diverters useful in the pneumatic carrier transfer system of our invention. Line diverters 85, 86 and 87 can be linked together to function as a single inlet/outlet-type line diverter such as 88. Similarly, a diverter having a single inlet and two or more outlets can be linked together to provide a diverter for any number of station groups. The line diverter must have sufficient outlets to link them in parallel to all exchange diverters 89-92. Each exchange diverter has an associated pressure/vacuum supply means.

FIG. 2 shows that our new transfer system can have more pressure/vacuum supply means and exchange diverters than line diverters and station groups, thus providing additional storage and expansion capacity for our pneumatic tube system.

FIG. 3 shows that our pneumatic tube system can include fewer pressure/vacuum supply means and exchange diverters than line diverters and station groups, saving costs in systems where simultaneous carrier transfers are few. FIGS. 2 and 3 illustrate capped inlets and outlets for expansion as the system needs to grow.

What is claimed is:

1. A system for transferring pneumatic carriers from one pneumatic carrier receiving/dispatching station to another comprising a first group of pneumatic carrier diverters, each with an inlet linked through pneumatically-sealed tubes to at least one of said stations, a multiplicity of outlet means, and means for shiftably linking said inlet means to any one of said outlet means; a second group of said diverters, each with a multiplicity of inlet means and an outlet means, and means for shiftably linking said multiplicity of inlet means to said outlet means, said transferring system including a plurality of diverters of said first group and a plurality of diverters of said second group with at least three diverters and at least one of said first and said second groups of diverters; pneumatically-sealed tubes joining in parallel, all the diverters of said first group to all the diverters of said second group; and at least one means for supplying pressure and vacuum to said system, joined to the outlet means of a diverter of said second group.

2. The system of claim 1 wherein the outlet means of at least two diverters of said second group is joined to separate pressure/vacuum supply means.

3. The system of claim 2 further comprising means for operating each of said pressure/vacuum supply means simultaneously and independently of one another.

4. The system of claim 3 wherein said system permits directing a pneumatic carrier entering the system to the outlet means of any selected diverter of said second group, and for then directing said pneumatic carrier to and through any selected diverter of said first group.

5. The system of claim 4 wherein at least two diverters of said first group each has a single inlet means joined, through pneumatically-sealed tubes, to a separate group of stations.

6. The system of claim 3 wherein at least two diverters of said first group each has a single inlet means joined, through pneumatically-sealed tubes, to a separate group of stations.

7. The system of claim 2 wherein at least two diverters of said first group each has a single inlet means joined, through pneumatically-sealed tubes, to a separate group of stations.

8. The system of claim 1 wherein the outlet means of each diverter of said second group is joined to separate pressure/vacuum supply means.

9. The system of claim 8 further comprising means for operating each of said pressure/vacuum supply means simultaneously and independently of one another.

10. The system of claim 9 wherein said system permits directing a pneumatic carrier entering the system to the outlet means of any selected diverter of said second group, and for then directing said pneumatic carrier to, and through any selected diverter of said first group.

11. The system of claim 1 wherein at least two diverters of said first group each has a single inlet means joined, through pneumatically-sealed tubes, to a separate group of stations.

12. A pneumatic tube system including:
(a) A system for transferring pneumatic carriers from one pneumatic carrier receiving/dispatching station to another comprising a first group of pneumatic carrier diverters, each with an inlet linked through pneumatically-sealed tubes to at least one of said stations, a multiplicity of outlet means, and means for shiftably linking said inlet means to any one of said outlet means; a second group of said diverters, each with a multiplicity of inlet means and an outlet means, and means for shiftably linking said multiplicity of inlet means to said outlet means, said transferring system including a plurality of diverters of said first group, and a plurality of diverters of said second group with at least three diverters and at least one of said first and said second groups of diverters; pneumatically-sealed tubes joining, in parallel, all the diverters of said first group to all the diverters of said second group; and at least one means for supplying pressure and vacuum to said system, joined to the outlet means of a diverter of said second group; and
(b) At least two separate groups of stations, each station group including a single inlet/outlet pneumatic tube joined to the inlet means of one, and only one diverter of said first group of diverters, wherein said pneumatic tube system permits transferring a pneumatic carrier from one station group to another station group with no more than one shift in each diverter through which said pneumatic carrier passes.

13. The system of claim 12 wherein said system permits transferring a pneumatic carrier from one station in a group to another station within the same group with no more than one shift in each diverter through which said pneumatic carrier passes, and with said pneumatic carrier passing through no more than two diverters.

14. The system of claim 13 wherein at least one group of stations includes at least two subgroups of at least two stations each, with each subgroup including at least one station diverter having a plurality of inlets linked, through pneumatically-sealed tubes, to the inlet/outlet of at least two stations within said subgroup, and having outlet means linked, through pneumatically-sealed tubes, to inlet means of a subgroup diverter, said system including means for transferring a pneumatic carrier from any station in one subgroup to any station in any other subgroup within the same group without leaving said group during the transfer.

15. A pneumatic tube system including:
(a) A system for transferring pneumatic carriers from one pneumatic carrier receiving/dispatching station to another comprising a first group of pneumatic carrier diverters, each with an inlet linked through pneumatically-sealed tubes to at least one of said stations, a multiplicity of outlet means, and means for shiftably linking said inlet means to any one of said outlet means; a second group of said diverters, each with a multiplicity of inlet means and an outlet means, and means for shiftably linking said multiplicity of inlet means to said outlet means, said transferring system including a plurality of diverters of said first group, and a plurality of diverters of said second group with at least three diverters and at least one of said first and said second groups of diverters; pneumatically-sealed tubes joining, in parallel, all the diverters of said first group to all the diverters of said second group; and at least one means for supplying pressure and vacuum to said system, joined to the outlet means of a diverter of said second group; and
(b) At least two separate groups of station, each station group including a single inlet/outlet pneumatic tube joined to the inlet means of one, and only one diverter of said first group, said pneumatic tube system including means for linking any one of said pressure/vacuum supplying means to said pneumatic tube system for transferring a pneumatic carrier from one group of stations to another group of such stations.

16. The system of claim 15 wherein said system permits transferring a pneumatic carrier from one station in a group to another station within the same group with no more than one shift in each diverter through which said pneumatic carrier passes, and with said pneumatic carrier passing through no more than two diverters.

17. A pneumatic tube system including:
(a) A system for transferring pneumatic carriers from one pneumatic carrier receiving/dispatching station to another comprising a first group of pneumatic carrier diverters, each with an inlet linked through pneumatically-sealed tubes to at least one of said stations, a multiplicity of outlet means, and means for shiftably linking said inlet means to any one of said outlet means; a second group of said diverters, each with a multiplicity of inlet means and an outlet means, and means for shiftably linking said multiplicity of inlet means to said outlet means, said transferring system including a plurality of diverters of said first group, and a plurality of diverters of said second group with at least three diverters and at least one of said first and said second groups of diverters; pneumatically-sealed tubes joining, in parallel, all the diverters of said first group to all the diverters of said second group; and at least one means for supplying pressure and vacuum to said system, joined to the outlet means of a diverter of said second group; and
(b) At least two separate groups of stations, each station group including a single inlet/outlet pneumatic tube joined to the inlet means of one, and only one diverter in said first group, said pneumatic tube system permitting simultaneous transfer of more than one pneumatic carrier from one group of stations to another group of such stations.

18. The system of claim 17 further comprising means for transferring a pneumatic carrier from one station in a group to another station within the same group with no more than one shift in each diverter through which said pneumatic carrier passes, and with said pneumatic carrier passing through no more than two diverters.

* * * * *